United States Patent
Arya et al.

(10) Patent No.: US 12,001,866 B2
(45) Date of Patent: Jun. 4, 2024

(54) HARVEST VIRTUAL MACHINE FOR UTILIZING CLOUD-COMPUTING RESOURCES

(71) Applicant: Microsoft Technology Licensing, LLC, Redmond, WA (US)

(72) Inventors: Kapil Arya, Redmond, WA (US); Aditya Bhandari, Seattle, WA (US); Ricardo Gouvêa Bianchini, Bellevue, WA (US); Brian Jacob Corell, Sammamish, WA (US); Yimin Deng, Redmond, WA (US); Sameh M. Elnikety, Redmond, WA (US); Marcus Felipe Fontoura, Medina, WA (US); Inigo Goiri Presa, Bellevue, WA (US); Alper Gun, Kirkland, WA (US); Thomas Moscibroda, Bellevue, WA (US); Chandrasekhar Pasupuleti, Issaquah, WA (US); Ke Wang, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 313 days.

(21) Appl. No.: 16/459,069

(22) Filed: Jul. 1, 2019

(65) Prior Publication Data
US 2021/0004250 A1    Jan. 7, 2021

(51) Int. Cl.
G06F 9/455    (2018.01)
G06F 9/50    (2006.01)

(52) U.S. Cl.
CPC ........ *G06F 9/45558* (2013.01); *G06F 9/5038* (2013.01); *G06F 9/5077* (2013.01); *G06F 2009/45595* (2013.01)

(58) Field of Classification Search
CPC .. G06F 9/45558; G06F 9/5038; G06F 9/5077; G06F 2009/45595
See application file for complete search history.

(56) References Cited

U.S. PATENT DOCUMENTS 9,003,037 B2    4/2015    Beveridge
9,176,764 B1*    11/2015    Jorgensen ........... G06F 9/45558
(Continued)

FOREIGN PATENT DOCUMENTS

CN    109144706 A    1/2019
WO    2013106258 A1    7/2013

OTHER PUBLICATIONS

"Spot Instances", Retrieved from: https://web.archive.org/web/20180710134814/https:/docs.aws.amazon.com/AWSEC2/latest/UserGuide/using-spot-instances.html, Jul. 10, 2018, 6 Pages.
(Continued)

*Primary Examiner* — Emerson C Puente
*Assistant Examiner* — Jonathan R Labud
(74) *Attorney, Agent, or Firm* — RAY QUINNEY & NEBEKER P.C.; Adam K. Richards

(57) ABSTRACT

The present disclosure describes a type of virtual machine, which the present disclosure may refer to as a harvest virtual machine, that may allow improved utilization of physical computing resources on a cloud-computing system. First, the harvest virtual machine may be evictable. In other words, higher priority virtual machines may preempt the harvest virtual machine's access to physical computing resources. Second, the harvest virtual machine may receive access to a dynamic amount of physical computing resources during the course of its operating life. Third, the harvest virtual machine may have a minimum size (in terms of an amount of physical computing resources) and may terminate whenever the harvest virtual machine has access
(Continued)

to an amount of physical computing resources less than the minimum size.

20 Claims, 11 Drawing Sheets

(56) References Cited

U.S. PATENT DOCUMENTS

| | | | |
|---|---|---|---|
| 9,471,384 B2 | 10/2016 | Messerli | |
| 9,569,277 B1 | 2/2017 | Cropper et al. | |
| 2008/0141048 A1* | 6/2008 | Palmer | H04L 67/1008 713/300 |
| 2010/0050172 A1* | 2/2010 | Ferris | G06F 9/5072 718/1 |
| 2012/0246638 A1* | 9/2012 | He | G06F 9/45558 718/1 |
| 2013/0054776 A1* | 2/2013 | Kunze | G06F 9/5061 709/224 |
| 2013/0179881 A1 | 7/2013 | Calder et al. | |
| 2014/0007097 A1 | 1/2014 | Chin et al. | |
| 2014/0165060 A1* | 6/2014 | Muller | G06F 9/45558 718/1 |
| 2014/0223233 A1* | 8/2014 | Heyrman | G06F 11/202 714/23 |
| 2015/0248418 A1* | 9/2015 | Bhardwaj | G06F 16/122 707/694 |
| 2017/0286146 A1* | 10/2017 | Voigt | G06F 9/5027 |
| 2019/0034095 A1* | 1/2019 | Singh | G06F 9/45558 |
| 2019/0245757 A1* | 8/2019 | Meyer | G06F 8/60 |

OTHER PUBLICATIONS

Choudhury, Aavisek, "What you should know about Azure's Low priority VM's and possible use cases", Retrieved from: https://whyazure.in/what-you-should-know-about-azures-low-priority-vms-and-possible-use-cases/, Nov. 3, 2017, 11 Pages.

Edwards, Jeff, "Preemptible VM Instances Now Generally Available for Google's Compute Engine", Retrieved from: https://solutionsreview.com/cloud-platforms/preemptible-vm-instances-now-generally-available-for-googles-compute-engine/, Sep. 9, 2015, 5 Pages.

Hughes, et al., "Use low-priority VMs with Batch", Retrieved from: https://docs.microsoft.com/en-us/azure/batch/batch-low-pri-vms, Mar. 19, 2018, 9 Pages.

McCrory, Meagan, "Announcing low-priority VMs on scale sets now in public preview", Retrieved from: https://azure.microsoft.com/en-in/blog/low-priority-scale-sets/, May 3, 2018, 7 Pages.

Menache, et al., "On-demand, Spot, or Both: Dynamic Resource Allocation for Executing Batch Jobs in the Cloud", In Proceedings of 11th International Conference on Autonomic Computing, Jun. 18, 2014, pp. 1-13.

"International Search Report and Written Opinion Issued in PCT Application No. PCT/US20/033670", dated Sep. 1, 2020, 12 Pages.

* cited by examiner

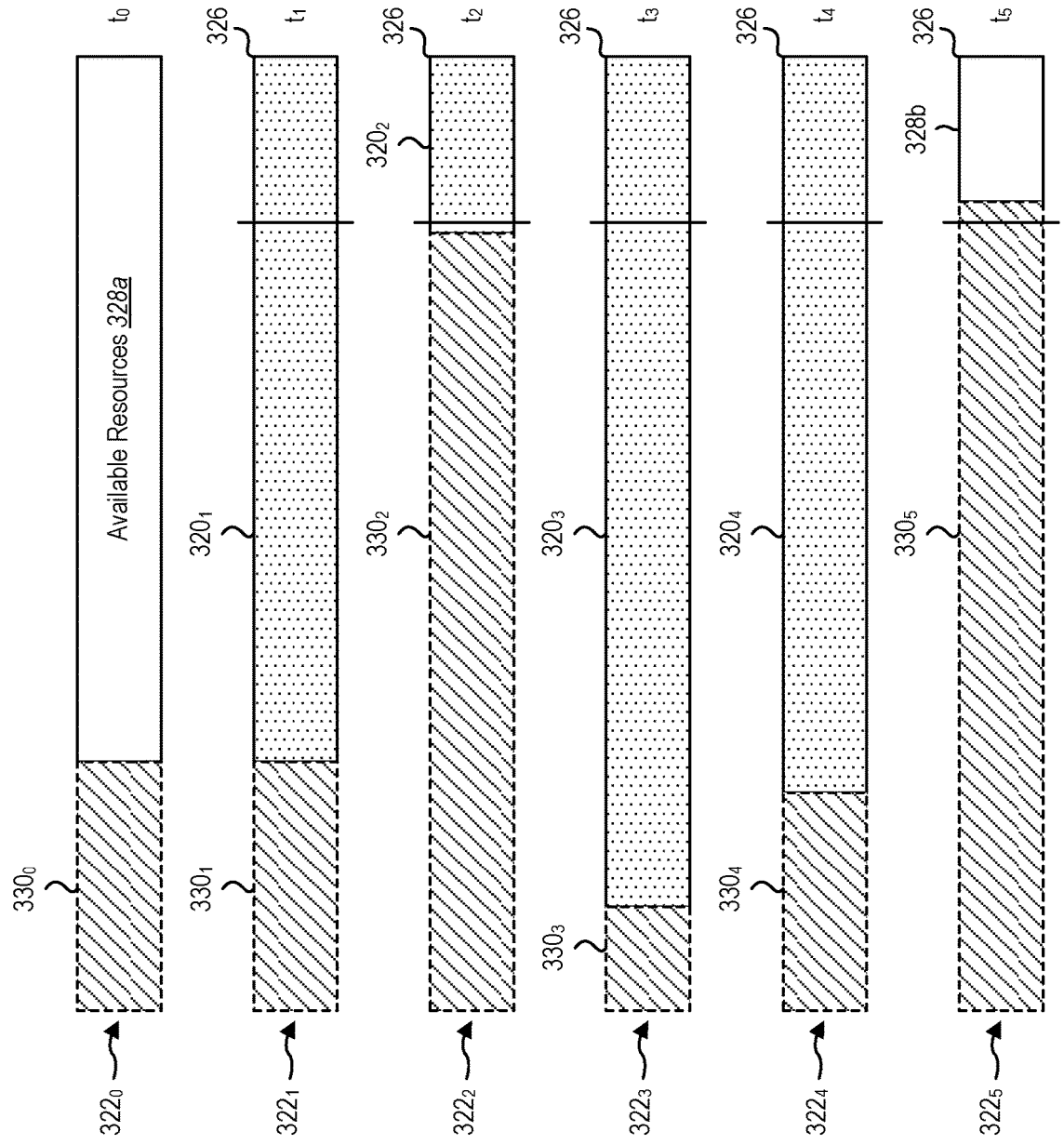

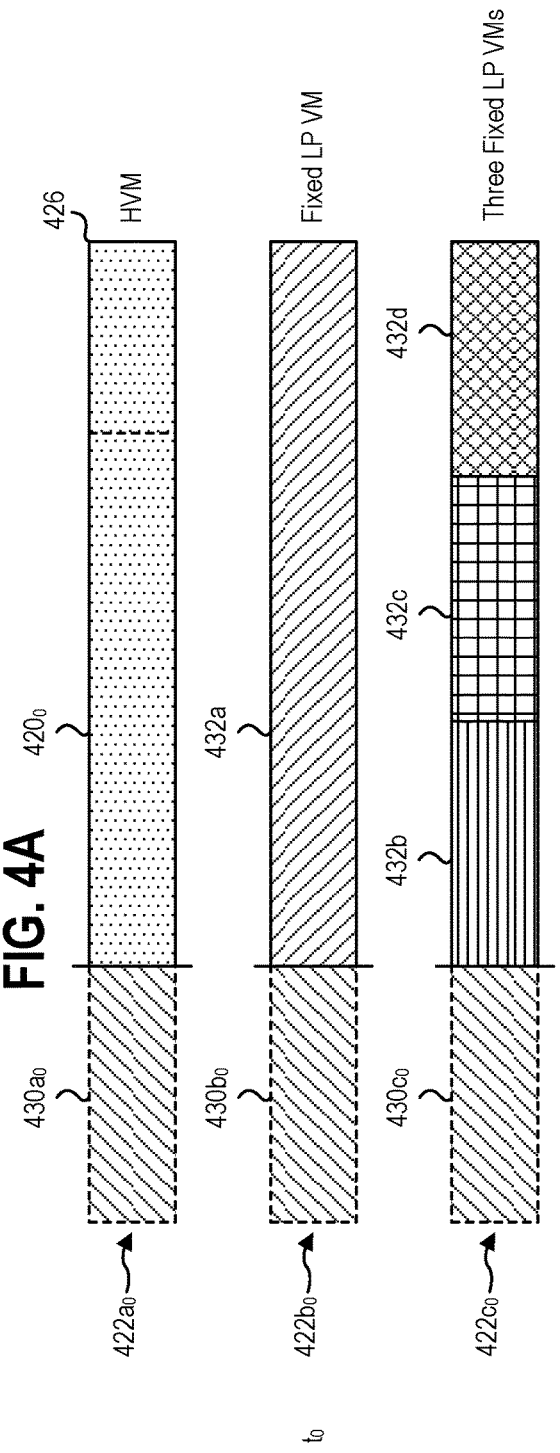
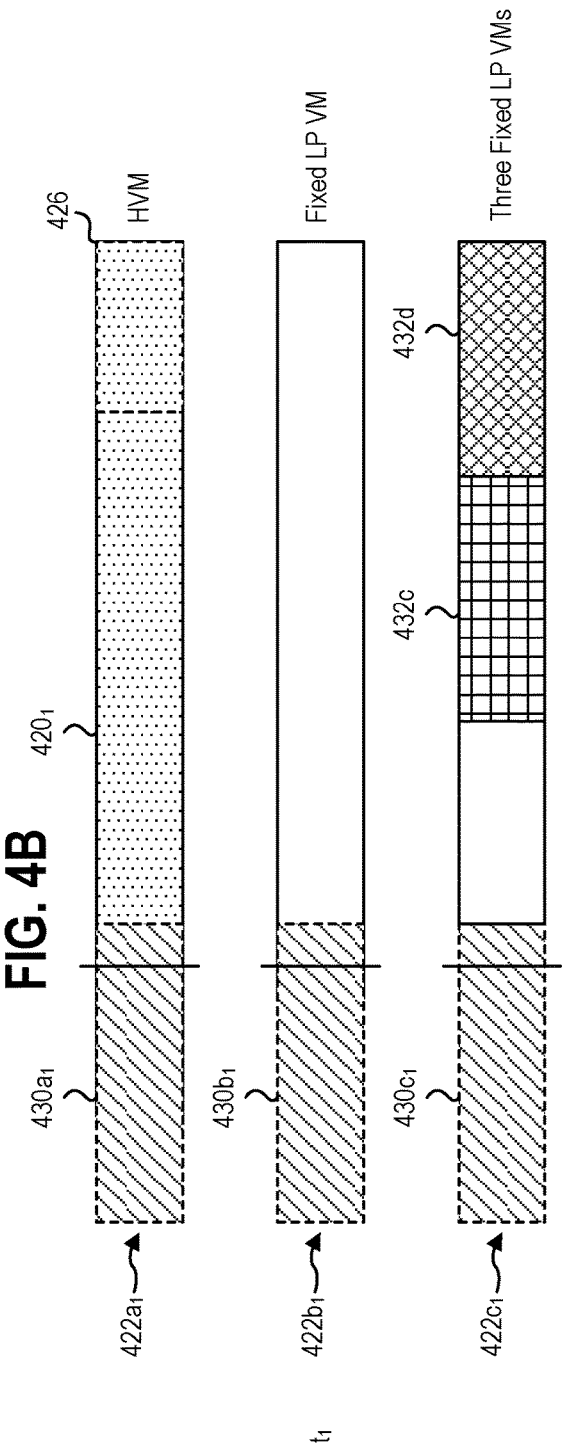

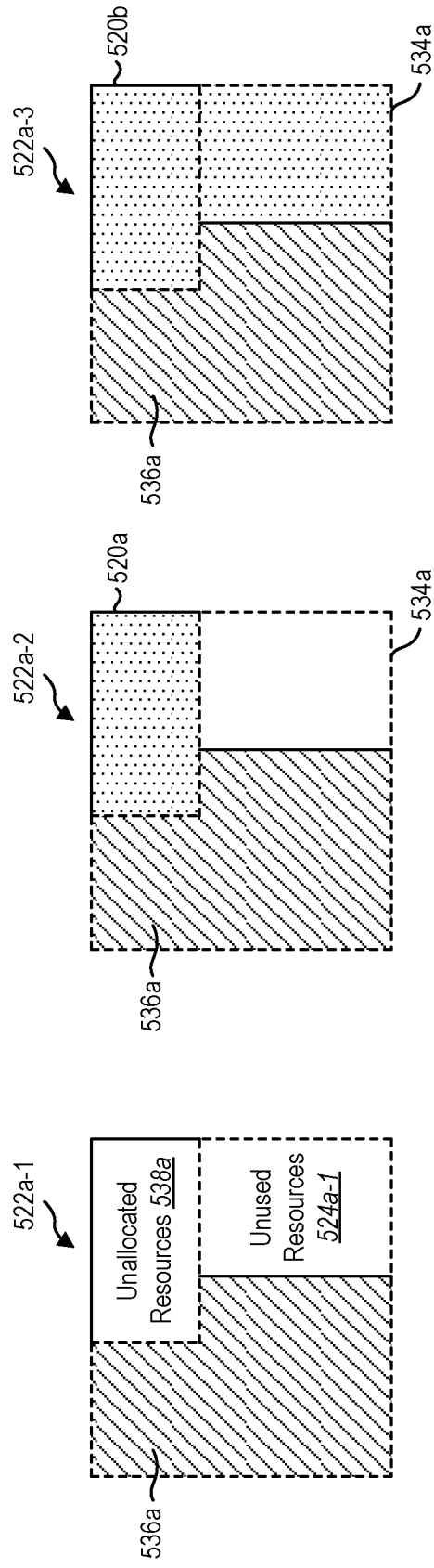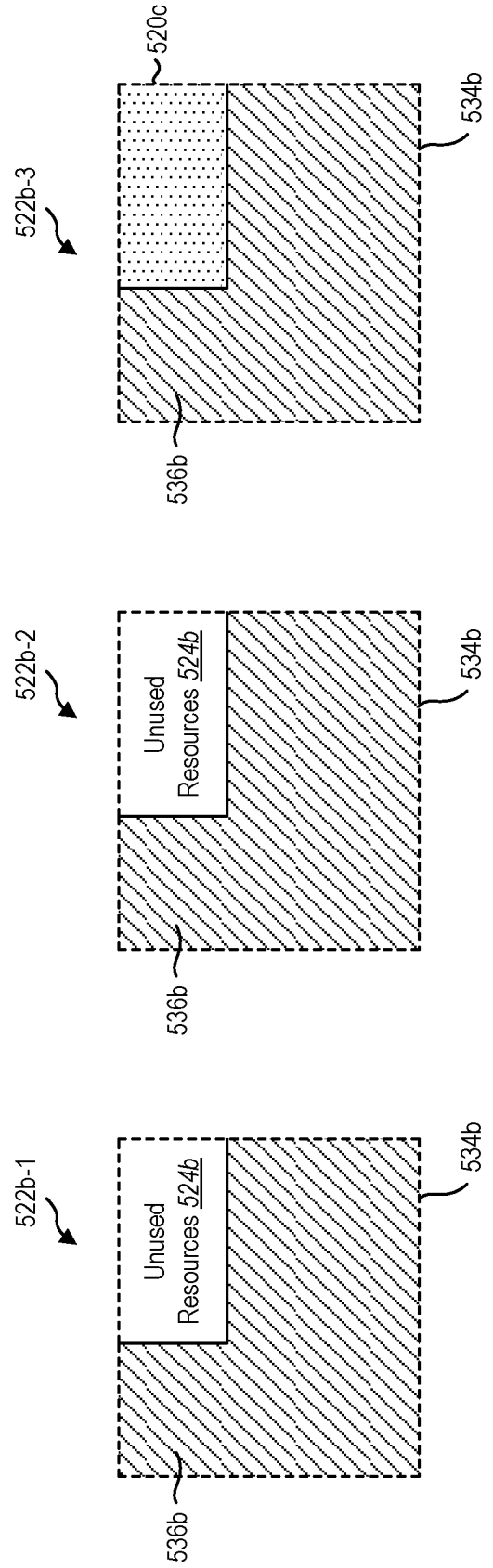

HARVEST VIRTUAL MACHINE FOR UTILIZING CLOUD-COMPUTING RESOURCES

CROSS-REFERENCE TO RELATED APPLICATIONS

N/A

BACKGROUND

A cloud-computing system may refer to a collection of computing devices or resources that can be accessed remotely. Stated another way, cloud computing may be described as the delivery of computing services (such as storage, databases, networking, software, processing, or analytics) over the Internet. Clients may access a cloud-computing system through a client device. The cloud-computing system may include resources that provide services to clients. These resources may include processors, memory, storage, and networking hardware.

A cloud-computing system may include a number of datacenters that may be located in different geographic locations. Each datacenter may include many servers. A server may be a physical computer system. The cloud-computing system may run virtual machines on a server. A virtual machine may be a program that emulates a distinct computer system but that can run on a server with other virtual machines. Like a physical computer, a virtual machine may include an operating system and applications.

At any given time, a cloud-computing system may include unused resources. In other words, it may be that virtual machines running on a server may not be using all the server's resources. Unused resources may represent a sunk cost that could be monetized or otherwise utilized.

SUMMARY

In accordance with one aspect of the present disclosure, a method is disclosed for utilizing physical resources of a cloud-computing system. The method may include deploying a virtual machine on a server with resources. At least a subset of the resources may be available resources. The method may also include granting the virtual machine access to an amount of the available resources, changing an amount of the resources to which the virtual machine has access, and terminating the virtual machine when the amount of the resources to which the virtual machine has access is less than a minimum amount.

The method may further include causing the virtual machine to process a workload.

The method may further include changing the amount of the resources to which the virtual machine has access is based at least in part on changes in allocation of the resources.

The changes in the allocation of the resources may include changes in the allocation of the resources to higher priority virtual machines.

The changing the amount of the resources to which the virtual machine has access may be based at least in part on changes in use of the resources.

The changes in the use of the resources may include changes in the use of the resources by higher priority virtual machines.

Granting the virtual machine access to the amount of the available resources may include granting the virtual machine access to all the available resources.

The changing the amount of the resources to which the virtual machine has access may include decreasing the amount of the resources to which the virtual machine has access and increasing the amount of the resources to which the virtual machine has access.

The minimum amount may include a minimum number of processing cores to which the virtual machine must have access in order to continue operating.

The virtual machine may have access to less than the minimum amount of the resources because one or more higher priority virtual machines cause less than the minimum amount of the resources to be available.

In accordance with another aspect of the present disclosure, a system is disclosed for providing cloud-computing services. The system may include one or more processors, memory in electronic communication with the one or more processors, and instructions stored in the memory. The instructions may be executable by the one or more processors to deploy a virtual container on a server with resources. The virtual container may have a minimum size. The instructions may also be executable by the one or more processors to grant the virtual container access to an amount of the resources on the server that are not being used, change the amount of the resources to which the virtual container has access based at least in part on changes in use of the resources, and terminate the virtual container when the amount of resources on the server to which the virtual container has access is less than the minimum size.

The virtual container may be a certain type of virtual container and the instructions may further include instructions to determine, before deployment of the virtual container, that the server does not include another virtual container of a same type as the virtual container.

The instructions may further include instructions being executable by the one or more processors to decrease the amount of the resources to which the virtual container has access when higher priority workloads use the resources. The higher priority workloads may include workloads performed for virtual containers having a higher priority than the virtual container.

In accordance with another aspect of the present disclosure, a server is disclosed that may be part of a cloud-computing system. The server may include physical computing resources available for use by virtual machines to perform client workloads and a virtual machine deployed on the physical computing resources. The virtual machine may have access to an amount of the physical computing resources, the virtual machine may have a minimum size, the amount of the physical computing resources to which the virtual machine may have access can change, the virtual machine may terminate if the amount of the physical computing resources to which the virtual machine has access is less than the minimum size, and the virtual machine may lose access to a physical computing resource when another virtual machine with a higher priority than the virtual machine makes the physical computing resource unavailable.

The amount of the physical computing resources to which the virtual machine has access may change based at least in part on changes in unavailability of the physical computing resources.

The physical computing resources may become unavailable at least when one or more other virtual machines with a higher priority than the virtual machine use the physical computing resources.

The physical computing resources may become unavailable at least when the physical computing resources are allocated to one or more other virtual machines with a higher priority than the virtual machine.

The physical computing resources may include a first type and a second type and the minimum size of the virtual machine may specify a first minimum amount of the first type of physical computing resource and a second minimum amount of the second type of physical computing resource.

The virtual machine may terminate if either the virtual machine has access to an amount of the first type of physical computing resource less than the first minimum amount or the virtual machine has access to an amount of the second type of physical computing resource less than the second minimum amount.

The virtual machine may terminate if the virtual machine has access to an amount of the first type of physical computing resource less than the first minimum amount and the virtual machine has access to an amount of the second type of physical computing resource less than the second minimum amount.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which:

FIG. 3 illustrates one potential example of how a harvest virtual machine may utilize available resources.

FIGS. 4A and 4B illustrate one potential example of how a harvest virtual machine may better utilize available resources than one or more fixed-size preemptable virtual machine.

FIGS. 5A-5F illustrate some potential differences in how granting a harvest virtual machine access to unallocated resources may differ from granting a harvest virtual machine access to unused resources.

DETAILED DESCRIPTION

Figure 1:
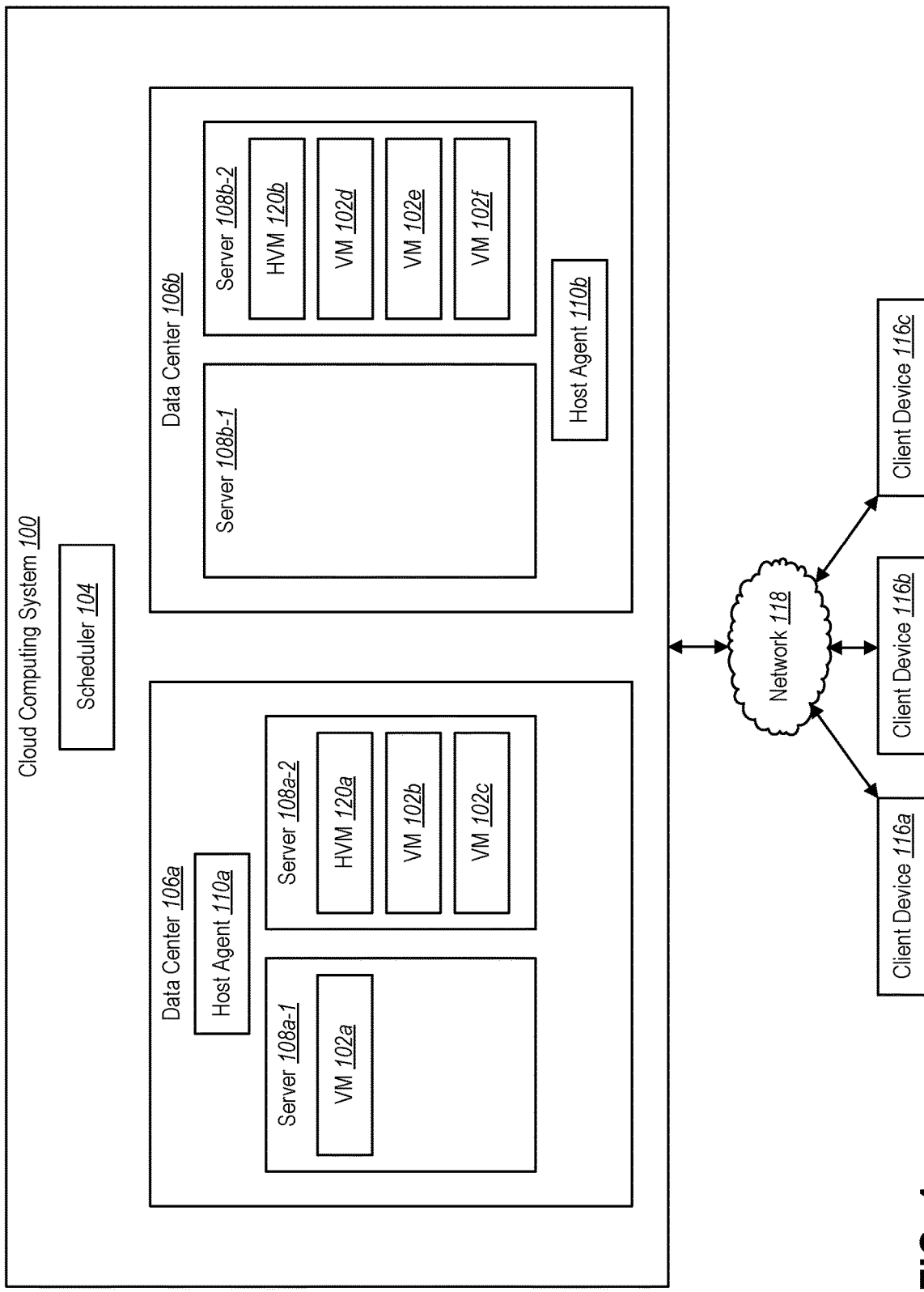
FIG. 1 illustrates one potential example of a cloud-computing system on which a harvest virtual machine may be used in accordance with the present disclosure.

This disclosure relates generally to utilizing physical computing resources of a cloud-computing system. It concerns a type of virtual container that, compared to existing technology, may allow an operator of the cloud-computing system to better utilize the physical computing resources of the cloud-computing system.

A cloud-computing system may provide client devices the opportunity to utilize physical computing resources in exchange for monetary payment. (This disclosure may refer to "physical computing resources" as "physical resources" or "resources.") The cloud-computing system may provide clients guaranteed access to a defined amount of physical resources for a defined period of time. The cloud-computing system may cause physical resources on the cloud-computing system to process workloads on behalf of a client device through the use of a virtual container (e.g., a virtual machine ("VM")) deployed on a host server within the cloud-computing system. At any given time, the cloud-computing system may have physical resources that host servers and virtual machines are not using. Unused physical resources may represent a lost monetization opportunity and lost processing opportunity. An operator of the cloud-computing system may desire to better utilize physical resources of the cloud-computing system to increase revenue and processing output without interfering with use of physical resources by client devices that have paid for guaranteed access to physical resources.

One potential way to better utilize physical resources of the cloud-computing system is through use of a "harvest virtual machine" ("HVM"). A harvest virtual machine may have the general characteristics of other virtual containers but may also have the following properties.

First, a harvest virtual machine may be preemptable (which may also be referred to as "evictable"). The harvest virtual machine may be granted access to physical resources on a server but may not be guaranteed access to those resources or to any particular amount of resources. The harvest virtual machine may receive access to resources only to the extent that the resources are available or not unavailable. A cloud-computing system may use a variety of criteria to determine whether a resource is available or unavailable. For example, availability of resources may be based on allocation of resources. Availability of resources may also be based on use of resources. In some cases, it may be based on both allocation and use.

Availability of resources may relate to priority levels in a cloud-computing system. Virtual machines deployed in a cloud-computing system may have a priority level. A cloud-computing system may include two or more levels of priority for virtual machines. The priority level of a virtual machine may determine whether a first virtual machine or a second virtual machine will receive access to a resource when a conflict exists for allocation or use of a resource.

The harvest virtual machine may have a priority level lower than one or more other virtual machines in a cloud-computing system. Thus, the harvest virtual machine may lose access to a resource because the cloud-computing system allocates that resource to a virtual machine with a priority level higher than the harvest virtual machine or because the virtual machine with the higher priority level begins using that resource. For example, a client device may have paid for guaranteed access to a defined amount of resources. The cloud-computing system may deploy a virtual machine on behalf of the client device and assign a priority level to the virtual machine higher than the priority level assigned to a harvest virtual machine. The harvest virtual machine may lose access to a resource when the cloud-computing system allocates that resource to the higher priority virtual machine or when the higher priority virtual machine begins using that resource.

Making a harvest virtual machine preemptable may mean that a harvest virtual machine will not interfere with use of physical resources by client devices that have paid for guaranteed access to physical resources.

Second, the harvest virtual machine may be variable in size in terms of the amount of physical resources to which it has access at any given time during the course of its operating life.

At deployment, the harvest virtual machine may receive access to a first amount of resources on a server. If additional resources become available on a server, the harvest virtual machine may receive access to the additional resources while also maintaining access to the first amount of resources. Additional resources may become available if, for example, other virtual machines were using an amount of resources at the time the harvest virtual machine was deployed but have since stopped using those resources.

If, at some point, a resource to which the harvest virtual machine has access becomes unavailable, the harvest virtual machine may lose access to the resource. The harvest virtual machine may nevertheless maintain access to a remainder of the resources to which the harvest virtual machine previously had access. A resource to which the harvest virtual machine has access at one point may become unavailable to the harvest virtual machine at a later point, for example, when a higher priority virtual machine needs access to the resource. The higher priority virtual machine may require access to the resource when the resource is allocated to the higher priority virtual machine. In other designs, the higher priority virtual machine may require access to the resource only when the higher priority virtual machine begins using the resource.

Allowing a harvest virtual machine to receive access to a variable amount of resources during the course of the harvest virtual machine's existence allows the harvest virtual machine to utilize more of a server's resources than would fixed-size preemptable virtual machines.

Third, the harvest virtual machine may have a minimum size. The size of a harvest virtual machine may be the amount of resources to which it has access. The minimum size of a harvest virtual machine may be a minimum amount of resources to which the harvest virtual machine requires access in order to continue operating. It may be that once the harvest virtual machine has access to less than that minimum amount of resources, the harvest virtual machine terminates. Terminating the harvest virtual machine only when the harvest virtual machine has access to less than a minimum amount of resources leads to fewer terminations than would occur if the harvest virtual machine had a fixed size. If the harvest virtual machine had a fixed size, the cloud-computing system would terminate the harvest virtual machine each time a higher-priority virtual machine needed any amount of the resources to which the harvest virtual machine had received access. Fewer terminations may mean higher utilization of a server's resources.

The operator of a cloud-computing system can use the harvest virtual machine to offer available resources (such as unallocated or unused resources) to clients at a discount price. Use of a harvest virtual machine at a discount price may appeal to clients who have batch workloads that are not time sensitive and/or do not have a real-time requirement. In this way, the harvest virtual machine may generate purchases that would not otherwise occur. Thus, use of harvest virtual machines may allow the operator to increase revenue without increasing the amount of resources in the cloud-computing system.

A harvest virtual machine may also allow the operator of a cloud-computing system to utilize otherwise unused system resources to process internal workloads. The operator of the cloud-computing system may use a harvest virtual machine to utilize available resources to process batch workloads that are not time sensitive and/or that do not have a real-time requirement. Thus, using harvest virtual machines may allow the operator to increase system output without interfering with use of resources by clients.

As used in the present disclosure, a "cloud computing system" may refer to a network of connected computing devices that provide various services to client devices. For example, a distributed computing system may include a collection of physical server devices (such as server nodes) organized in a hierarchical structure. Such a hierarchical structure may include computing zones, clusters, virtual local area networks (VLANs), racks, fault domains, etc. One or more specific examples and implementations described herein may relate specifically to "data centers" that include multiple server nodes. But the features and functionality described in connection with one or more node data centers may similarly relate to racks, fault domains, or other hierarchical structures of physical server devices. The cloud computing system may refer to a private or public cloud computing system.

As used in the present disclosure, a "computing container" or "virtual container" may refer to a virtual service or layer on a server node of a cloud computing system that provides access to computing resources (such as a storage space) and/or a software application hosted by the cloud-computing system. Computing containers may provide services to any number of containerized applications on a cloud-computing system. As used in the present disclosure, a "virtual service" may refer to a service provided by a cloud-computing system.

A "virtual machine" may refer to an emulation of a computer system on a server node that provides functionality of one or more applications on the cloud computing system. Virtual machines may provide functionality needed to execute one or more operating systems. In addition, virtual machines may make use of hypervisors on processors of server devices that support virtual replication of hardware. While one or more specific examples and implementations described herein may relate specifically to virtual machines, features and functionality described in connection with utilizing resources on a server node may similarly apply to other types of computing containers.

This disclosure will now reference illustrative figures portraying example implementations of a harvest virtual machine.

FIG. 1 illustrates some potential aspects of a cloud-computing system 100 that may include harvest virtual machines 120a, 120b.

The cloud-computing system 100 may include data centers 106a, 106b. The data centers 106a, 106b may include servers 108a-1, 108a-2, 108b-1, 108b-2. The servers 108 may include physical computing resources (such as processing cores, memory, disk storage, and network bandwidth) that the cloud-computing system 100 may use to provide services to client devices 116a, 116b, 116c. The cloud-computing system 100 may provide services to the client devices 116 through use of virtual machines 102a, 102b, 102c, 102d, 102e, 102f and the harvest virtual machines 120. The client devices 116 may access the cloud-computing system 100 through a network 118.

The cloud-computing system 100 may include a scheduler 104, and the data centers 106 may include host agents 110a, 110b. The scheduler 104 may work with the host agents 110 to deploy and manage the virtual machines 102 and the harvest virtual machines 120. For example, the scheduler 104 may receive a request to provide services to the client device 116a. The scheduler 104 may, in response to the request, deploy virtual machine 102b to server 108a-2. In the alternative, the scheduler 104 may instruct host agent 110a to deploy the virtual machine 102b on the server 108a-2 or may instruct the host agent 110a to deploy the virtual machine 102b on a server in the data center 106a. The scheduler 104 or the host agent 110a may allocate a certain amount of resources on the server 108a-2 to the virtual machine 102b. The virtual machine 102b may use some or all the allocated resources to process workloads on behalf of the client device 116a. The scheduler 104 or the host agent may determine when to terminate the virtual machine 102b.

The scheduler 104 may also receive a request to provide services to the client device 116b. The client device 116b may have workloads that do not have a real-time requirement and may pay a discount price to have non-guaranteed access to resources on the cloud-computing system 100. In response to the request, the scheduler 104 may deploy the harvest virtual machine 120b on the server 108b-2 and the harvest virtual machine 120a on the server 108a-2. The harvest virtual machines 120 may have the following characteristics.

First, the harvest virtual machines 120 may be preemptable. That may mean that the harvest virtual machine 120a receives conditional access to resources on the server 108a-2 and the harvest virtual machine 120b receives conditional access to resources on the server 108b-2. The harvest virtual machines 120 may receive access to resources only to the extent (i.e., on condition that) the resources are available. Resources may be available based on allocation or use of resources on the servers 108a-2, 108b-2. Resources on the servers 108a-2, 108b-2 may be available based on whether the resources are allocated to or being used by virtual machines 102b, 102c, 102d, 102e, 102f. Availability may be based only on allocation, only on use, or both. It may be that a virtual machine cannot use a resource unless the resource has been allocated to the virtual machine. Availability may also be based on other or additional criteria than the criteria described above.

Provided here is an example of when a resource may be available. At deployment, the harvest virtual machine 120a may receive access to a first resource and a second resource on the server 108a-2. The first resource and the second resource may be available because the first resource and the second resource are not allocated to the virtual machine 102b or the virtual machine 102c. In the alternative, the first resource and the second resource may be available because neither the virtual machine 102b nor the virtual machine 102c is using the first resource or the second resource. In the latter example, the second resource may be allocated to the virtual machine 102c but the virtual machine 102c may not be using the second resource.

Provided here is an example of when the first resource may become unavailable. The harvest virtual machine 120a may lose access to the first resource when the host agent 110a allocates the first resource to the virtual machine 102b. In the alternative or in addition to the above example, the harvest virtual machine 120a may lose access to the second resource when the virtual machine 120c begins using the second resource.

Adding to the above example, the harvest virtual machine 120a may lose access to the first resource and/or the second resource because the virtual machines 102a, 102c have a higher priority than the harvest virtual machine 120a. Thus, where allocation determines availability, the harvest virtual machine 120a may lose access to any resources that are allocated to the virtual machines 102a, 102c because the virtual machines 102a, 102c have a higher priority right to access resources. Where use determines availability, the harvest virtual machine 120a may lose access to any resources used by the virtual machines 102a, 102c because the virtual machines 102a, 102c have a higher priority right to use resources.

Second, the harvest virtual machines 120 may receive access to a variable amount of resources during the existence of the harvest virtual machines 120. For example, the scheduler 104 may deploy harvest virtual machine 120a to the server 108a-2. At deployment, the scheduler 104 may grant the harvest virtual machine 120a access to an initial amount of resources. For example purposes only, assume that the initial amount of resources includes 20 processing cores. At some later point in time, a higher priority virtual machine such as virtual machine 102b (which may be a newly deployed virtual machine or an existing virtual machine) may need 10 of the 20 processing cores to which the harvest virtual machine 120a originally had access. The host agent 110a may deny the harvest virtual machine 120a access to 10 of the 20 processing cores to which it initially had access. The scheduler 104 may not, however, terminate the harvest virtual machine 120a. Instead, the harvest virtual machine 120a may continue to process workloads but do so using up to 10 processing cores rather than 20 processing cores.

At some later point in time, four processing cores on server 108a-2 may become available for use by the harvest virtual machine 120a. The four processing cores may become available because the four processing cores were previously allocated to the virtual machine 102c but are no longer allocated to the virtual machine 102c. In the alternative, the four processing cores may become available because the virtual machines 102b, 102c were previously using the four processing cores but are no longer using them. The host agent 110a may grant the harvest virtual machine 120a access to the four processing cores that have become available. The harvest virtual machine 120a may then use up to 14 processing cores to process workloads. The amount of resources to which a harvest virtual machine has access may be considered a size of the harvest virtual machine. Thus, the harvest virtual machine 120a may be considered to have a size of 14 processing cores at the end of the example described above.

Third, each of the harvest virtual machines 120 may have a minimum amount of resources to which each of the harvest virtual machines 120 must have access in order to continue processing workloads. This minimum amount of resources may be referred to as a "minimum size." The host agents 110 or the scheduler 104 may terminate harvest virtual machines 120 that receive access to an amount of resources less than their minimum size.

Using again the example described above in connection with describing the variable size of the harvest virtual machines 120, assume the harvest virtual machine 120a on the server 108a-2 has a minimum size of eight processing cores. Shrinking from 20 processing cores to 10 processing cores would not cause the scheduler 104 to terminate the harvest virtual machine 120a. Increasing from 10 processing cores to 14 processing cores in size would also not cause the harvest virtual machine 120a to terminate. But assume for illustration purposes that eight of the 14 processing cores to which the harvest virtual machine 120a had access at the end of the example described above become unavailable to the harvest virtual machine 120a. When the harvest virtual machine 120a loses access to those eight processing cores, the scheduler 104 will terminate the harvest virtual machine 120a because at that time the size (six processing cores) of the harvest virtual machine 120a will be less than the minimum size (eight processing cores) of the harvest virtual machine 120a.

FIGS. 2A to 2D illustrate how a harvest virtual machine 220 may utilize resources 222 on a server 208.

In FIGS. 2A through 2D, the server 208 includes resources 222. The resources 222 may include physical computing resources such as processing cores, memory, disk storage, and network bandwidth. The resources 222 may represent all physical computing resources on the server 208 that are not reserved for use for host processes. In other designs, the resources 222 may include physical computing resources the server 208 may use for performing host processes. References to resources $222_0$, $222_1$, $222_2$, $222_3$ are intended to refer to the same physical computing resources just at different moments in time. Similarly, references to harvest virtual machines $220_1$, $220_2$ are intended to refer to the same harvest virtual machine 220 just at different moments in time. And references to virtual machine $202d_2$, $202d_3$ are intended to refer to the same virtual machine 202d just at different moments in time.

Figure 2A:
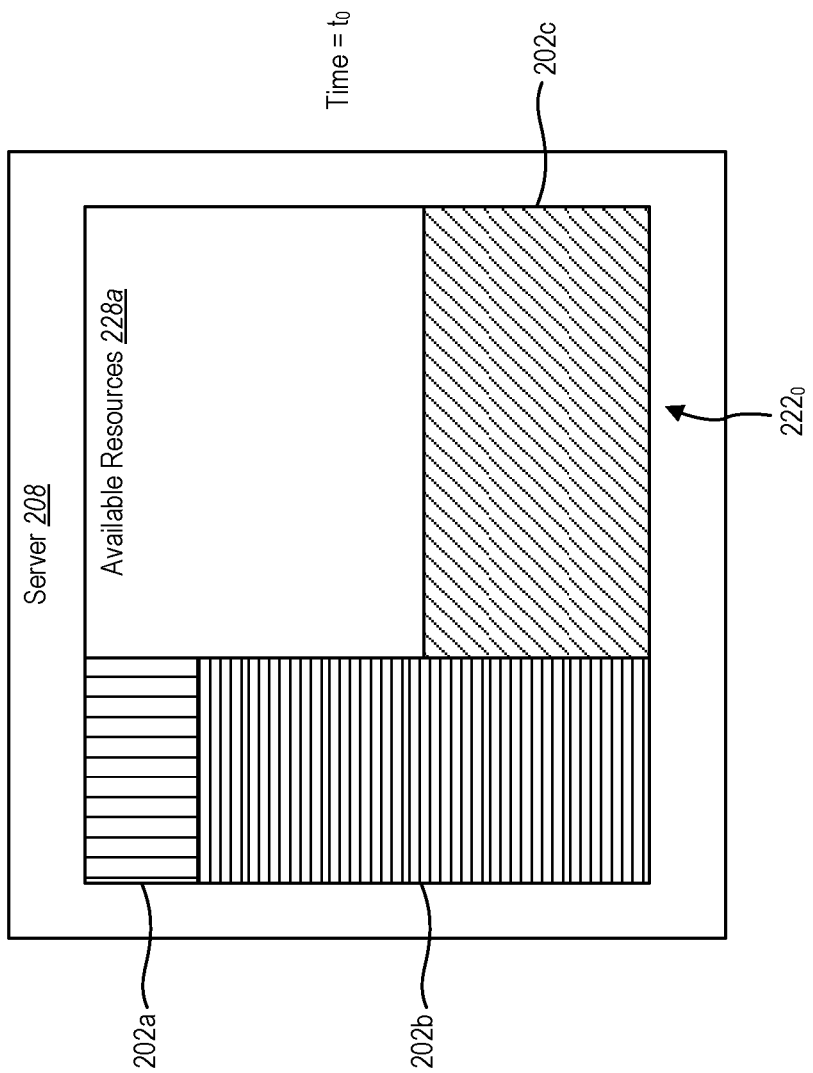
FIGS. 2A-2D illustrate one potential example of how a harvest virtual machine may utilize unused resources on a server.

FIG. 2A represents a state of the resources $222_0$ on the server 208 at time $t_0$. The resources $222_0$ may include virtual machines 202a, 202b, 202c. The amount of resources that are unavailable due to virtual machine 202a are represented by the portion of the resources $222_0$ The amount of resources that are unavailable due to virtual machine 202b are represented by the portion of the resources $222_0$ shaded with horizontal lines. The amount of resources that are unavailable due to virtual machine 202c are represented by the portion of the resources $222_0$ shaded with forward-leaning diagonal lines.

The resources $222_0$ may include an amount of available resources 228a. The available resources 228a are represented by the portion of the resources $222_0$ that are not shaded. In some examples, the available resources 228a may represent the amount of the resources $222_0$ that are not currently being used. In other examples, the available resources 228a may represent the amount of the resources $222_0$ that are not allocated.

Availability may be relative to a particular virtual machine. The availability of resources may depend on the priority level of a particular virtual machine. More resources may be available to a virtual machine with a high priority level than to a virtual machine with a low priority level. Assume for purposes of FIGS. 2A-2D that availability is relative to the harvest virtual machine 220.

Figure 2B:
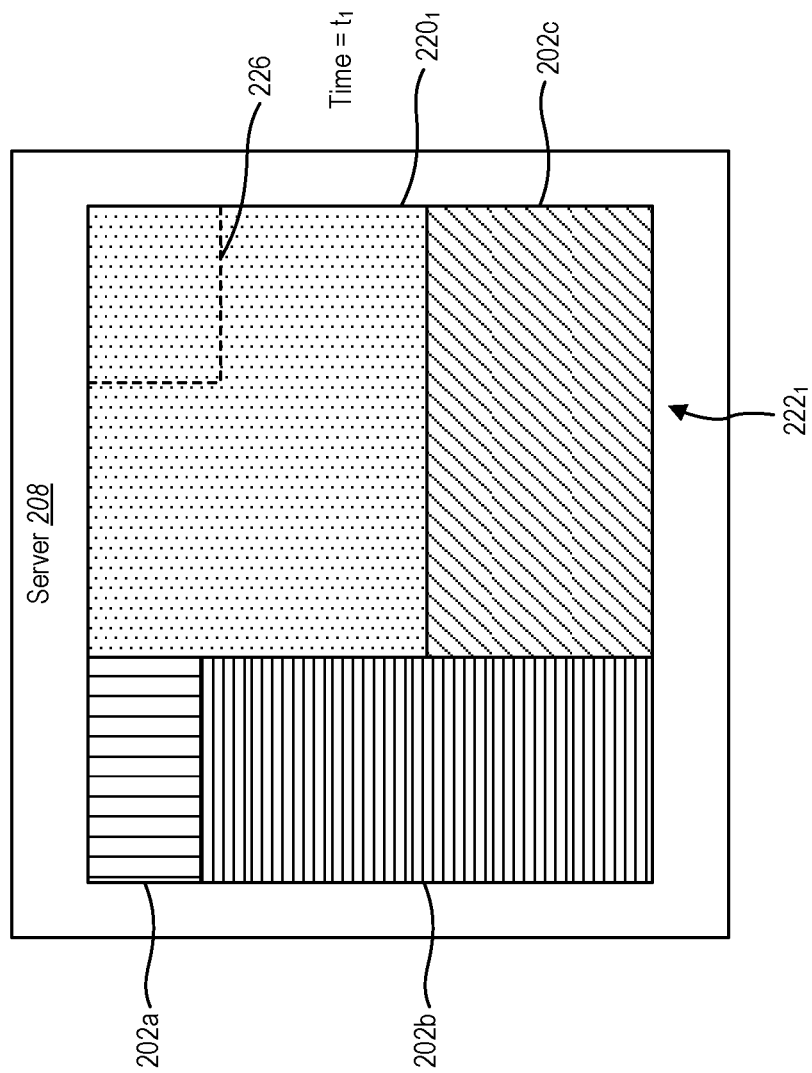

FIG. 2B represents a state of the resources $222_1$ on the server 208 at time $t_1$. For purposes of this illustration, $t_1$ is after $t_0$. At time $t_1$, the resources $222_1$ include the virtual machines 202a, 202b, 202c that were included in the resources $222_0$ at time $t_0$. At time $t_1$, however, the resources $222_1$ may also include a harvest virtual machine $220_1$. The harvest virtual machine $220_1$ may have access to an amount of resources represented by the portion of the resources $222_1$ filled in with dots. The harvest virtual machine $220_1$ may have access to an amount of resources equal to the amount of the available resources 228a. In other designs, a harvest virtual machine may receive access to less than an amount of available resources.

The harvest virtual machine $220_1$ may have a lower priority than the virtual machines 202a, 202b, 202c. That may mean that the harvest virtual machine $220_1$ cannot access the portion of the resources $222_1$ made unavailable by the virtual machines 202a, 202b, 202c. It may also mean that if the virtual machine 202a needs additional resources and is allowed to access an amount of additional resources (for example, if a service level agreement applicable to the virtual machine 202a allows access to the amount of additional resources), then the harvest virtual machine $220_1$ loses access to the amount of additional resources needed by the virtual machine 202a.

The harvest virtual machine $220_1$ may have a minimum size 226. The minimum size 226 may represent a minimum amount of resources necessary for the harvest virtual machine $220_1$ to continue existing. It may be that once the harvest virtual machine $220_1$ does not have access to an amount of resources equal to or greater than the minimum size 226, the harvest virtual machine $220_1$ terminates. The minimum size 226 is shown in FIG. 2B by the portion of the resources $222_1$ outlined by a dashed line.

Figure 2C:
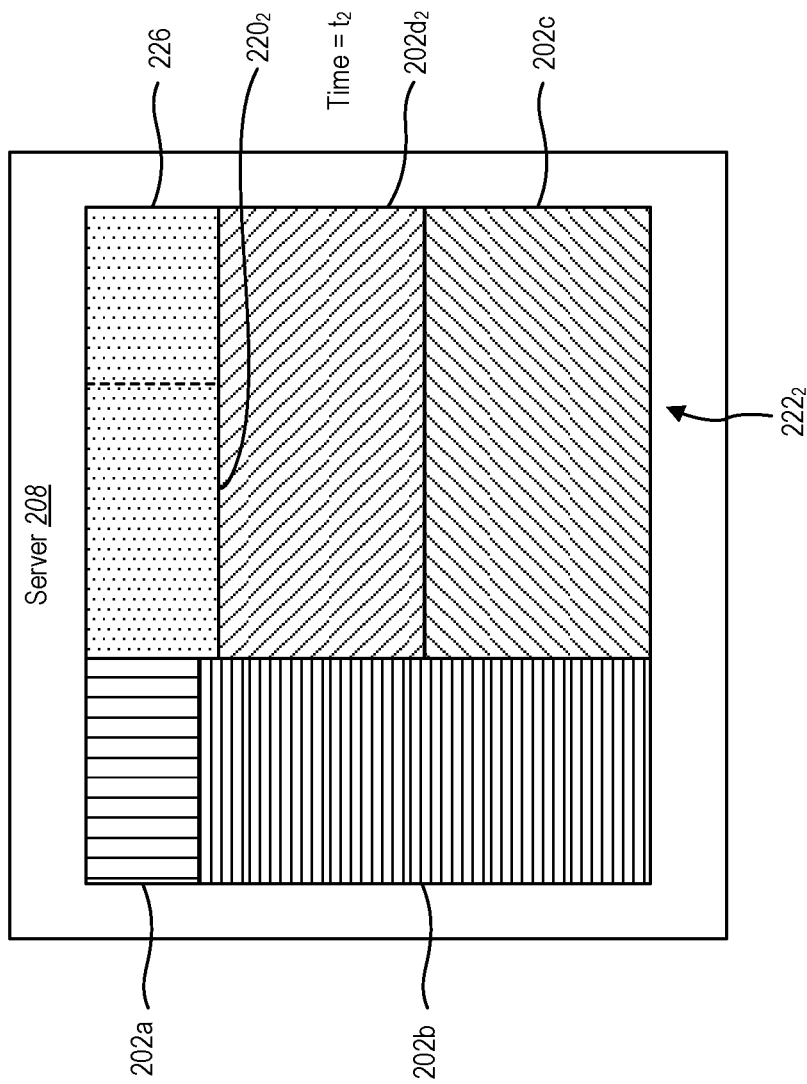

FIG. 2C represents a state of resources $222_2$ at time $t_2$. For purposes of this illustration, $t_2$ is after $t_1$. At time $t_2$, the resources $222_2$ may include the virtual machines 202a, 202b, 202c included in the resources $222_0$, $222_1$. The virtual machines 202a, 202b, 202c may make unavailable an amount of the resources $222_2$ identical to the amount of resources $222_1$ the virtual machines 202a, 202b, 202c made unavailable at time $t_1$.

At time $t_2$, however, the resources $222_2$ may also include a virtual machine $202d_2$. The virtual machine $202d_2$ may cause an amount of resources represented by the portion of the resources $222_2$ shaded with backward-leaning diagonal lines to be unavailable. The virtual machine 202d may have a higher priority than the harvest virtual machine 220. The virtual machine $202d_2$ may be using resources to which the harvest virtual machine $220_1$ had access at time $t_1$. Because the virtual machine 202d has a higher priority than the harvest virtual machine 220, the harvest virtual machine $220_2$ does not have access to the portion of the resources $222_2$ rendered unavailable by the virtual machine $202d_2$.

At time $t_2$, the harvest virtual machine $220_2$ may still have access to an amount of resources represented by the portion of the resources $222_2$ filled in with dots. Because the harvest virtual machine $220_2$ still has access to an amount of resources equal to or greater than the minimum size 226, the harvest virtual machine $220_2$ continues to operate and may continue processing workloads using the amount of the resources $222_2$ filled in with dots.

Figure 2D:
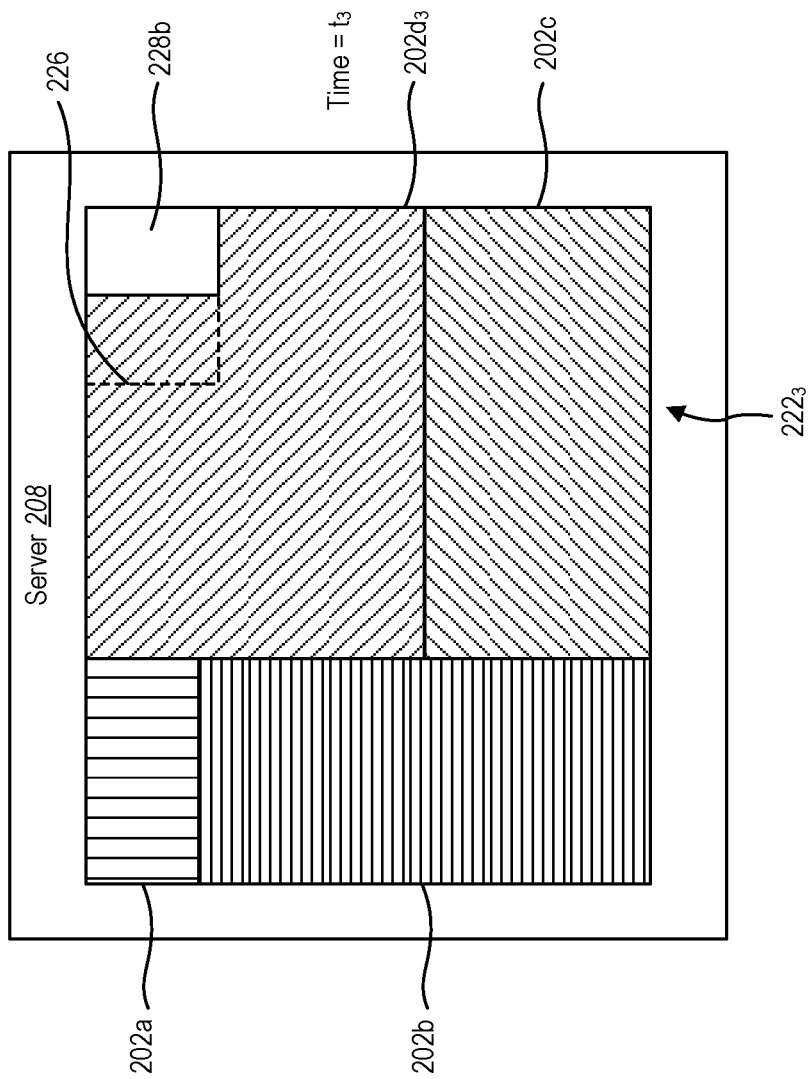

FIG. 2D represents a state of the resources $222_3$ at time $t_3$. For purposes of this illustration, $t_3$ is after $t_2$. At time $t_3$, the resources $222_3$ may still include virtual machines 202a, 202b, 202c. At time $t_3$, the resources 222 may also still include the virtual machine 202d. The virtual machine $202d_3$ may make unavailable an amount of resources represented by the portion of the resources $222_3$ shaded with backward-leaning diagonal lines. The virtual machine $202d_3$ may be using more resources at time $t_3$ than the virtual machine $202d_2$ at time $t_2$. Because the virtual machine $202d_3$ has a higher priority than the harvest virtual machine 220, the harvest virtual machine 220 lost access to the additional portion of the resources 222 the virtual machine $202d_3$ is using at time $t_3$ that the virtual machine $202d_2$ was not using at time $t_2$.

At time $t_3$, the resources $222_3$ may not include the harvest virtual machine 220. The harvest virtual machine 220 may have terminated because the harvest virtual machine 220 no longer had access to an amount of resources equal to or greater than the minimum size 226.

At time $t_3$, the resources 222 may include an amount of available resources 228b. The available resources 228b in FIG. 2D are less than the minimum size 226.

FIG. 3 illustrates a potential example of using a harvest virtual machine 320 to utilize available resources 328a. FIG. 3 illustrates a state of resources 322 at six different points in time: $t_0$, $t_1$, $t_2$, $t_3$, $t_4$, and $t_5$. The resources 322 may represent physical computing resources on a server. Use of subscripts in connection with element numbers is intended to identify the applicable time period. Reference to an element number without a subscript refers to that element generally and not at a specific time.

At time $t_0$, a portion of resources $322_0$ are unavailable resources $330_0$ and a portion of the resources are available resources 328a. A dotted line represents a border between the unavailable resources $330_0$ and the available resources 328a.

The unavailable resources 330 shown in FIG. 3 may represent an amount of the resources 322 to which a particular virtual container cannot be given access and into which the particular virtual container cannot expand. The unavailable resources 330 may represent an amount of the resources 322 that are needed by other virtual containers. Various criteria may be used to determine what resources are unavailable resources 330.

In some designs, unavailability may be based on allocation. Unavailability may be based on whether resources are currently allocated or unallocated. It may be based on whether resources are allocated to a host server and other virtual containers. It may be based on whether resources are allocated to a host server, equal or higher priority virtual containers, processes associated with the host server, or processes associated with equal or higher priority virtual containers.

For example, the unavailable resources 330 may represent the portion of the resources 322 that have been allocated. In another example, the unavailable resources 330 may represent the portion of the resources 322 that have been allocated for use by a virtual container with a priority level equal to or higher than the particular virtual container or by a host server or for use by processes associated with a virtual container with a priority level equal to or higher than the particular virtual container or by the host server. In another example, the unavailable resources 330 may represent the portion of the resources 322 allocated to non-preemptable virtual containers. It may be that a virtual container with a priority level equal to or higher than the particular container or a non-preemptable virtual container may need resources that are allocated to those containers.

Allocated resources may be resources that a host server or a virtual container has a right to access. Allocated resources may be resources a cloud-computing system has designated for use by a host server or a virtual container. Allocated resources may not be in use. In some designs, allocated resources may be resources to which a particular virtual container is guaranteed to have access during a defined period of time. In other designs, allocated resources may include shared resources that a first virtual machine and a second virtual machine both have a right to access during a defined period of time or subject to certain conditions. The first virtual machine may be able to access the shared resources only when the second virtual machine is not using the shared resources. Similarly, the second virtual machine may be able to access the shared resources only when the first virtual machine is not using the shared resources. In this situation, a third virtual machine of equal priority to the first virtual machine and the second virtual machine may not be able to access the shared resources, even when neither the first virtual machine nor the second virtual machine are using the shared resources.

In other designs, unavailability may be based on use. Unavailability may be based on whether resources are being used or not being used. It may be based on whether resources are being used by a host server and other virtual containers or not. It may be based on whether resources are being used by a host server, equal or higher priority virtual containers, processes associated with the host server, or processes associated with equal or higher priority virtual containers.

For example, the unavailable resources 330 may represent the portion of the resources 322 currently being used. In another example, the unavailable resources 330 may represent the portion of the resources 322 currently being used by virtual containers with a priority level equal to or higher than the particular virtual container or by a host server. In another example, the unavailable resources 330 may represent the portion of the resources 322 being used by non-preemptable virtual containers. In these designs, the virtual containers with a priority level equal to or higher than the particular container and the non-preemptable virtual containers may need resources when they use resources.

In other designs, unavailability may be based on both use and allocation. For example, the unavailable resources 330 may represent the portion of the resources 322 allocated to a host server and currently being used by virtual containers with a priority level equal to or greater than the particular virtual container.

In other designs, unavailability may be determined as a converse to availability. In other words, all resources that are not available may be considered unavailable. For example, the unavailable resources 330 may represent all resources that are not included in the available resources 328 shown in FIG. 3.

The available resources 328 shown in FIG. 3 may represent all resources to which a particular virtual container can receive access. The available resources 328 may represent all resources that are not needed by other virtual containers relative to the particular virtual container. Various criteria may be used to determine whether a resource is available.

In some designs, all resources that are not included in the unavailable resources 330 are included in the available resources 328.

In some designs, availability may be based on allocation. Availability may be based on whether resources are allocated or unallocated. It may be based on whether resources are allocated to a host server and other virtual containers or not. It may be based on whether resources are allocated to a host server, equal or higher priority virtual containers, processes associated with the host server, or processes associated with equal or higher priority virtual containers.

For example, the available resources 328 may represent the portion of the resources 322 that have not been allocated. In another example, the available resources 328 may represent an amount of the resources 322 not allocated to existing virtual containers with a priority level equal to or higher than the particular virtual container or the host server. Stated another way, the available resources 328 may represent resources that can be allocated to the particular virtual container. In another example, the available resources 328 may represent an amount of the resources 322 not allocated to non-preemptable virtual containers. In these designs, resources not allocated to virtual containers with a priority level equal to or higher than the particular virtual container or to non-preemptable virtual containers are not needed by those containers.

In some designs, availability may be based on use. Availability may be based on whether resources are being used or not being used. It may be based on whether resources are being used by a host server and other virtual containers or not. It may be based on whether resources are being used by a host server, equal or higher priority virtual containers, processes associated with the host server, or processes associated with equal or higher priority virtual containers.

For example, the available resources 328 may represent the portion of the resources 322 that are not being used. In another example, the available resources 328 may represent an amount of the resources 322 that are not currently being used by the host server or virtual containers with a priority level equal to or greater than the particular virtual container. In another example, the available resources 328 may represent an amount of the resources 322 not being used by non-preemptable virtual containers. In these designs, resources not being used by virtual containers with a priority level equal to or higher than the particular virtual container or by non-preemptable virtual containers are not needed by those containers.

In other designs, availability may be based on both use and allocation. For example, the available resources 328 may represent the portion of the resources 322 not allocated to a host server and not currently being used by virtual containers with a priority level equal to or greater than the particular virtual container.

At time $t_1$ in FIG. 3, a harvest virtual machine $320_1$ is deployed and given access to a portion of the resources $322_1$. The portion of the resources $322_1$ to which the harvest virtual machine $320_1$ is given access is filled in with dots. As shown in FIG. 3, the harvest virtual machine $320_1$ may receive access to all the available resources $328a$. In other examples, a harvest virtual machine may receive access to less than all available resources.

Even though the harvest virtual machine $320_1$ receives access to the available resources $328a$, the harvest virtual machine $320_1$ does not receive access to the unavailable resources $330_1$. Nor can the harvest virtual machine $320_1$ access the unavailable resources $330_1$.

The harvest virtual machine 320 has a minimum size 326. In FIG. 3, the minimum size 326 is represented by the portion of the resources 322 to the right of a solid line.

At time $t_2$ in FIG. 3, unavailable resources $330_2$ encompass an amount of the resources $322_2$ greater than an amount of the resources $322_1$ included in the unavailable resources $330_1$ at time $t_1$. The unavailable resources $330_2$ may have a larger size than the unavailable resources $330_1$ for a variety of reasons. One potential reason may be that additional virtual containers were deployed and those virtual containers had a priority level higher than the priority level of the harvest virtual machine 320. The growth of the amount of the unavailable resources 330 may also have resulted from increases in the amount of the resources 322 allocated to or used by virtual containers that existed at time $t_1$ and still exist at time $t_2$.

At time $t_2$, the harvest virtual machine $320_2$ may lose access to the portion of the resources $322_2$ that were included in the available resources $328a$ at time $t_1$ but are included in the unavailable resources $330_2$ at time $t_2$.

The harvest virtual machine $320_2$ is not terminated at time $t_2$ because the size of the harvest virtual machine $320_2$ is greater than the minimum size 326.

At time $t_3$ in FIG. 3, the amount of the resources $322_3$ included in the unavailable resources $330_3$ is less than the amount of the resources $322_2$ included in the unavailable resources $330_2$ at time $t_2$. The unavailable resources $330_3$ may have a smaller size than the unavailable resources $330_2$ because one or more virtual containers that existed at time $t_2$ have since terminated. The decrease in the amount of the unavailable resources $330_3$ may also be due to decreases in resources allocated to or used by virtual containers that existed at time $t_2$ and still exist at time $t_3$.

At time $t_3$, the harvest virtual machine $320_3$ gains access to the portion of the resources $322_3$ that was included in the unavailable resources $330_2$ at time $t_2$ but is not included in the unavailable resources $330_3$ at time $t_3$.

At time $t_4$ in FIG. 3, the amount of the resources $322_4$ included in the unavailable resources $330_4$ increases as compared to time $t_3$. The harvest virtual machine $320_4$ is not terminated at time $t_4$ because the size of the harvest virtual machine $320_4$ is greater than the minimum size 326.

At time $t_5$ in FIG. 3, the amount of the resources $322_5$ included in unavailable resources $330_5$ is greater than the amount of the resources $322_4$ included in the unavailable resources $330_4$ at time $t_4$. At time $t_5$, the resources $322_5$ no longer include the harvest virtual machine 320. The harvest virtual machine 320 is terminated at least in part because the amount of the available resources $328b$ is less than the minimum size 326.

FIGS. 4A and 4B illustrate one example way in which a harvest virtual machine may make better utilize resources than fixed-size preemptable virtual machines.

FIG. 4A shows resources $422a_0$, $422b_0$, $422c_0$. Assume for purposes of FIG. 4A that the resources $422a_0$ are equivalent to the resources $422b_0$ and to the resources $422c_0$. Also assume for purposes of FIG. 4A that the resources $422a_0$, $422b_0$, $422c_0$ all include equal amounts of unavailable resources $430a_0$, $430b_0$, $430c_0$.

The resources $422a_0$ include a harvest virtual machine $420_0$. The harvest virtual machine $420_0$ has access to an amount of the resources $422a_0$ represented by the area of the resources $422a_0$ filled with dots. The harvest virtual machine $420_1$ does not have access to the unavailable resources $430a_0$, which are represented by forward-leaning diagonal lines. The harvest virtual machine $420_0$ may have a minimum size 426.

The resources $422b_0$ include a fixed-size preemptable virtual machine $432a$ (which may also be referred to as a fixed-size lower-priority virtual machine or "Fixed LP VM"). The fixed-size preemptable virtual machine $432a$ may be a virtual machine with the following characteristics. First, the fixed-size preemptable virtual machine $432a$ may be preemptable. As with a harvest virtual machine, that may mean that other types of virtual machines can override the right of the fixed-size preemptable virtual machine $432a$ to access physical computing resources. Second, the fixed-size preemptable virtual machine $432a$ may be fixed in size. That may mean that the fixed-size preemptable virtual machine 432a may utilize up to a fixed amount of resources and will not access more than that fixed amount of resources during its operating lifespan. Third, the fixed-size preemptable virtual machine 432a may terminate once it can no longer access an amount of resources equal to its fixed size.

The fixed-size preemptable virtual machine 432a may have a fixed size shown as an amount of the resources 422b shaded by backward-leaning diagonal lines. The fixed size of the fixed-size preemptable virtual machine 432a may be equal to an amount of the resources $422a_0$ to which the harvest virtual machine $420_0$ has access.

The resources $422c_0$ may include fixed-size preemptable virtual machines 432b, 432c, 432d. Each of the fixed-size preemptable virtual machines 432b, 432c, 432d may have an equal fixed size. The total amount of resources to which the fixed-size preemptable virtual machines 432b, 432c, 432d may have access may be equal to the fixed size of the fixed-size preemptable virtual machine 432a.

FIG. 4B shows the resources $422a_1$, $422b_1$, $422c_1$ at time $t_1$, which occurs after time $t_0$. At time $t_1$, the amount of the unavailable resources $430a_1$, $430b_1$, $430c_1$ has increased as compared to time $t_0$. In FIG. 4B, the amount of the unavailable resources $430a_1$ is equal to the amount of the unavailable resources $430b_1$ and the amount of the unavailable resources $430c_1$.

The harvest virtual machine $420_1$ has access to a smaller amount of the resources $422a_1$ at time $t_1$ than the harvest virtual machine $420_0$ had at time $t_0$. The harvest virtual machine $420_1$ has lost access to the portion of the resources $422a_1$ that were not included in the unavailable resources $430a_0$ at time $t_0$ but are included in the unavailable resources $430a_1$ at time $t_1$. The harvest virtual machine $420_1$ did not terminate as a result of the increase in size of the unavailable resources $430a_1$ at least in part because the harvest virtual machine $420_1$ still has access to an amount of the resources $422a_1$ greater than or equal to the minimum size 426.

At time $t_1$, the resources $422b_1$ no longer include the fixed-size preemptable virtual machine 432a. The fixed-size preemptable virtual machine 432a may have terminated because the fixed-size preemptable virtual machine 432a no longer had access to an amount of the resources 422b equal to the fixed size of the fixed-size preemptable virtual machine 432a. It may be that because the fixed-size preemptable virtual machine 432a terminated, the resources $422b_1$ that are not currently included in the unavailable resources $430b_1$ are not being made available to any virtual containers and/or are not being used by any virtual containers. That amount of resources may represent a lost revenue and/or a lost output opportunity.

At time $t_1$, the resources $422c_1$ still include the fixed-size preemptable virtual machines 432c, 432d but no longer include the fixed-size preemptable virtual machine 432b. The fixed-size preemptable virtual machine 432b may have terminated because the fixed-size preemptable virtual machine 432b no longer has access to an amount of the resources $422c_1$ equal to the fixed size of the fixed-size preemptable virtual machine 432b. It may be that because the fixed-size preemptable virtual machine 432b terminated, the resources $422c_1$ include resources that are not being made available to any virtual containers and/or are not being used by any virtual containers. That amount of resources may represent a lost revenue and/or a lost output opportunity.

FIGS. 5A-5F illustrate how harvest virtual machines 520 may be deployed differently based on granting access to unallocated resources 538 versus granting access to unused resources 524.

FIG. 5A shows resources 522a-1. A portion of the resources 522a-1 are allocated resources 534a. The allocated resources 534a may be resources that are allocated to existing virtual machines. It may be that existing virtual machines are guaranteed access to the allocated resources 534a. The portion of the resources 522a-1 that are allocated resources 534a may be the portion of the resources 522a-1 outlined by a dashed line. The portion of the resources 522a-1 that are unallocated resources 538a may be the portion of the resources 522a-1 not outlined by a dashed line.

Not all the allocated resources 534a may be in use. In other words, the allocated resources 534a may include a portion of in-use resources 536a and a portion of unused resources. The in-use resources 536a are shown in FIG. 5A by forward-leaning diagonal lines. The portion of the resources 522a-1 that are unused resources 524a is represented by blank space. Both the allocated resources 534a and the unallocated resources 538a include some of the unused resources 524a.

FIG. 5B shows resources 522a-2 with the same amounts of allocated resources 534a and in-use resources 536a as in FIG. 5A. In FIG. 5B, however, the resources 522a-2 include a harvest virtual machine 520a. For example purposes, the harvest virtual machine 520a in FIG. 5B receives access to the unallocated resources 538a only. Thus, the harvest virtual machine 520a does not receive access to the portion of the unused resources 524a that are included in the allocated resources 534a. The resources 522a-2 as shown in FIG. 5B include resources that are not being made available for use.

FIG. 5C shows the resources 522a-3 with the same amounts of allocated resources 534a and in-use resources 536a as in FIG. 5A. In FIG. 5C, however, the resources 522a-3 include a harvest virtual machine 520b. Unlike in FIG. 5B, in the example of FIG. 5C, the harvest virtual machine 520b receives access to the unused resources 524a as opposed to just the unallocated resources 538a. Thus, the harvest virtual machine 520b initially has access to a greater amount of resources than the harvest virtual machine 520a. Moreover, all the resources 522a-3 shown in FIG. 5C are being made available for use.

FIG. 5D shows resources 522b-1. All the resources 522b-1 are allocated resources 534b as shown by a dashed line that outlines all the resources 522b-1. But not all the allocated resources 534b are currently in use. The allocated resources 534b include in-use resources 536b and unused resources 524b. The in-use resources 536b are shown in FIG. 5D by forward-leaning diagonal lines. The portion of the resources 522a that are the unused resources 524b is represented by blank space.

FIG. 5E shows the resources 522b-2 with the same amounts of allocated resources 534b, in-use resources 536b, and unused resources 524b as in FIG. 5D. Assuming for purposes of this illustration that resources are not available to a harvest virtual machine unless the resources are unallocated, a harvest virtual machine cannot be deployed on the resources 522b-2 because the resources 522b-2 are all allocated resources 534b.

FIG. 5F shows the resources 522b-3 with the same amounts of allocated resources 534b and in-use resources 536b as in FIG. 5D. In FIG. 5F, however, the resources 522b-3 include a harvest virtual machine 520c. Assume for purposes of FIG. 5F that resources are available based on use and the harvest virtual machine 520c has a minimum size that is less than the amount of the unused resources 524b. Thus, unlike in FIG. 5E, the harvest virtual machine 520c can be deployed on the resources 522b-3. Even though the resources 522b-3 are all allocated resources 534b, the allocated resources 534b included the unused resources 524b.

Figure 6:
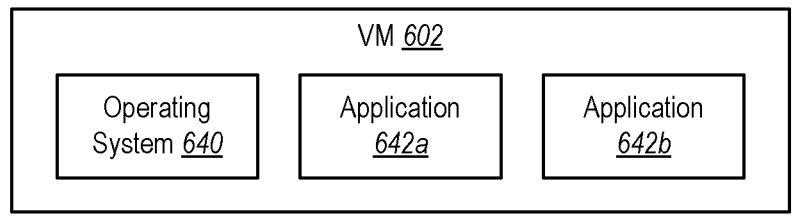
FIG. 6 illustrates one potential example of a virtual machine that may be utilized in accordance with the present disclosure.

FIG. 6 shows one potential example of a virtual machine 602. The virtual machine 602 may include an operating system 640, an application 642a, and an application 642b.

The virtual machine 602 may belong to a particular virtual machine family. A virtual machine family may include a number of different types of virtual machines with certain common characteristics. A harvest virtual machine may be included in a virtual machine family with other types of virtual machines. In other designs, a harvest virtual machine may be a separate virtual machine family.

In some designs, the application 642a may receive access to information about how many resources the virtual machine 602 has access to. Thus, where the virtual machine 602, the application 642a may receive information about when the virtual machine 602 gains access to more resources and when it loses access to resources. In some designs, the application 642a may receive access to information about resource access while the application 642b does not.

Figure 7:
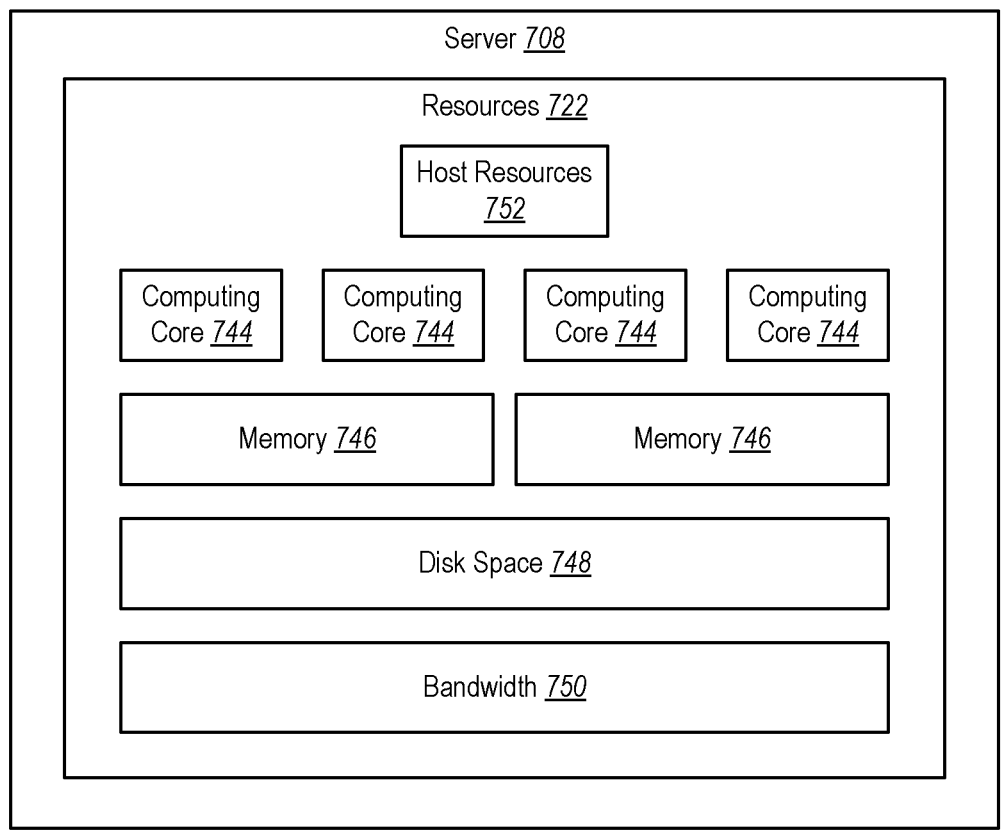
FIG. 7 illustrates one potential example of a server that may be utilized in accordance with the present disclosure.

FIG. 7 shows one potential example of a server and resources of the server.

A server 708 may include resources 722. The resources 722 may include host resources 752. The host resources 752 may be physical computing resources reserved for use by the server 708 for performing host processes and workloads.

The resources 722 may include a variety of types of physical computing resources, including computing cores 744, memory 746, disk space 748, and bandwidth 750. Virtual machines may use the resources 722 to process workloads.

Figure 8:
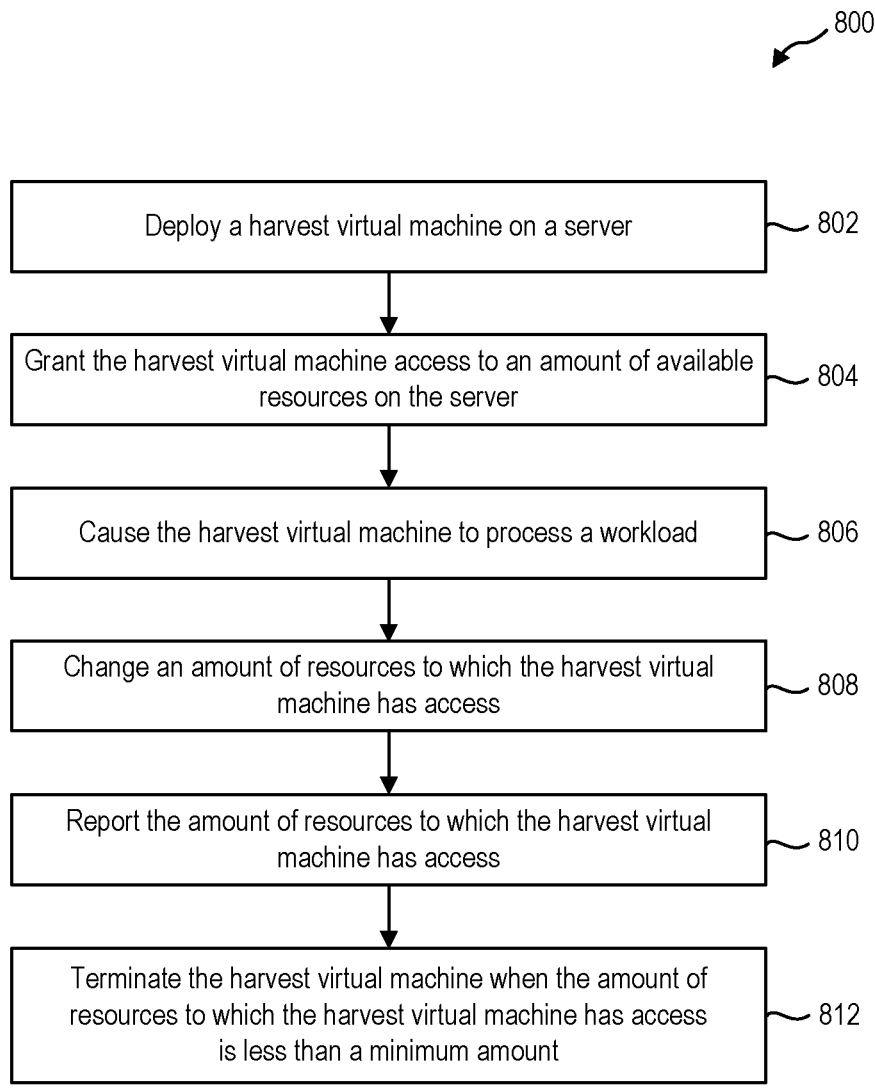
FIG. 8 illustrates one potential example of a method for using a harvest virtual machine to utilize resources of a cloud-computing system.

FIG. 8 illustrates one example of a method 800 for utilizing a harvest virtual machine. For the sake of clarity, the method will be described in relation to the systems, devices, components, and data described previously.

The method 800 may include deploying 802 a harvest virtual machine on a server.

The scheduler 104 may deploy the harvest virtual machine or may assign that task to the host agent 110. The scheduler 104 may deploy the harvest virtual machine as a regular virtual machine scale set deployment.

The scheduler 104 may deploy only one harvest virtual machine per server. To facilitate deploying only one harvest virtual machine per server each harvest virtual machine may include anti-affinity.

The scheduler 104 may also be designed to determine whether deployment of a harvest virtual machine would exceed a quota of allowable harvest virtual machines applicable to the customer. The scheduler 104 may also be designed to approve, deny, or require adjustment to each customer's request to deploy a harvest virtual machine.

The harvest virtual machine may have a minimum size at deployment. The minimum size may be in reference to one type of physical computing resource or multiple types of physical computing resources. For example, the harvest virtual machine may have a minimum size defined in terms of a minimum number of processing cores only. In another example, the harvest virtual machine may have a minimum size defined in terms of a minimum number of processing cores, a minimum amount of memory, and a minimum amount of storage space. The scheduler 104 may know only a minimal size of the harvest virtual machine.

In some designs, a client may define the minimum size of a harvest virtual machine. The client may define the minimum size of the harvest virtual machine before deployment. In other designs, the virtual machine type may define a minimum size for the harvest virtual machine. In such a design, each virtual machine type in a virtual machine family may have a different minimum size. Moreover, in such a design, the minimum size of the harvest virtual machine may be designed to be an amount that allows the harvest virtual machine to fit on most servers 108 within the cloud-computing system 100.

The scheduler 104 may not deploy the harvest virtual machine unless a server has an amount of resources equal to or greater than the minimum size of the harvest virtual machine.

The method 800 may include granting 804 the harvest virtual machine access to an amount of available resources on the server.

The harvest virtual machine may receive access to all available resource on the server. In some designs, the harvest virtual machine may receive access to all available resources of a first type but receive access to fewer than all available resources of a second type. For example, the harvest virtual machine may receive access to all available processing cores on a server but receive access to less than all available memory on the server.

To facilitate dynamic resizing of the harvest virtual machine the host agent 110 may create all harvest virtual machines with a defined amount of virtual resources. The host agent 110 will constrain the defined amount of virtual resources to run on whatever amount of physical resources to which the harvest virtual machine receives access. For example, the host agent 110 may create a harvest virtual machine with 40 virtual cores. The host agent 110 will then constrain the 40 virtual cores to run on whatever number of physical processing cores to which the harvest virtual machine receives access.

The method 800 may include causing 806 the harvest virtual machine to process a workload. The harvest virtual machine may process batch workloads that do not have a real-time requirement.

The method 800 may include changing 808 an amount of resources to which the harvest virtual machine has access.

Changing 808 the amount of the resources to which the harvest virtual machine has access may be based on availability of the resources. Availability of the resources may be based on allocation of the resources, use of the resources, or both. Availability may also be based on other criteria.

Changing 808 the amount of the resources may include increasing the amount of resources to which the harvest virtual machine has access. Changing 808 the amount of the resources may also include decreasing the amount of resources to which the harvest virtual machine has access.

The host agent 110 may change the amount of all types of resources to which the harvest virtual machine has access or may change the amount of fewer than all the types of resources to which a harvest virtual machine has access. For example, assume the harvest virtual machine has access to processing cores and memory. The host agent 110 may change the amount of processing cores and memory to which the harvest virtual machine has access. In the alternative, the host agent 110 may change the number of processing cores to which the harvest virtual machine has access while leaving the amount of memory to which the harvest virtual machine has access fixed or unchanged.

The method 800 may include reporting 810 the amount of resources to which the harvest virtual machine has access.

The host agent 110 may report an amount of resources to which the harvest virtual machine has access. An operator of the cloud-computing system 100 may use this information to provide a customer with information about harvest virtual machines deployed on behalf of the customer. The host agent 110 may report the amount of resources to which the harvest virtual machine has access at regular intervals or upon request.

The host agent 110 may also make the amount of resources to which the harvest virtual machine has access available (either directly or indirectly) to applications running on the harvest virtual machine. For example, the host agent 110 may report to the application 642a that the virtual machine 602 (which may be considered a harvest virtual machine for purposes of this example) currently has access to 10 processing cores. The application 642a may use that information in determining how to process workloads. For example, the application 642a may process a workload differently depending on the number of processing cores available to the virtual machine 602.

The method 800 may include terminating 812 the harvest virtual machine when the amount of resources to which the harvest virtual machine has access is less than a minimum amount.

Customers may be able to specify a number of harvest virtual machines they desire in a steady state. The scheduler 104 may be designed, in that situation, to automatically attempt to deploy a replacement harvest virtual machine whenever a customer's existing harvest virtual machine is terminated.

Figure 9:
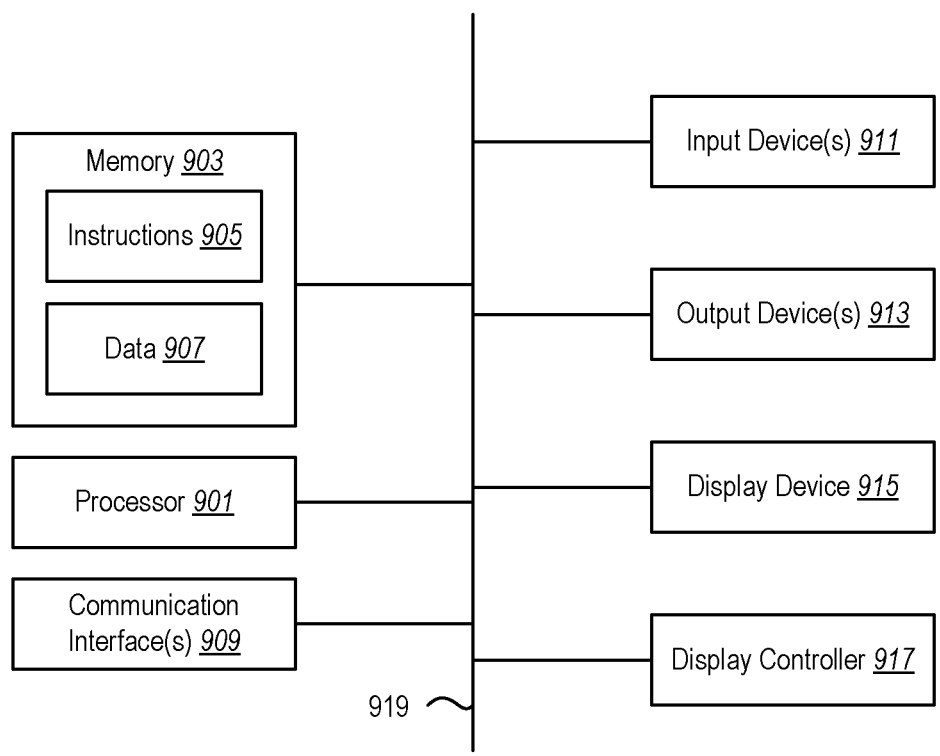
FIG. 9 illustrates certain components that may be included in a computing system.

FIG. 9 illustrates certain components that may be included within a computer system 900. One or more computer systems 900 may be used to implement the various devices, components, and systems described herein.

The computer system 900 includes a processor 901. The processor 901 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 901 may be referred to as a central processing unit (CPU). Although just a single processor 901 is shown in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 905 and data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during execution of the instructions 905 by the processor 901.

A computer system 900 may also include one or more communication interfaces 909 for communicating with other electronic devices. The communication interface(s) 909 may be based on wired communication technology, wireless communication technology, or both. Some examples of communication interfaces 909 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 900 may also include one or more input devices 911 and one or more output devices 913. Some examples of input devices 911 include a keyboard, mouse, microphone, remote control device, button, joystick, trackball, touchpad, and lightpen. Some examples of output devices 913 include a speaker and a printer. One specific type of output device that is typically included in a computer system 900 is a display device 915. Display devices 915 used with embodiments disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In an example, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for utilizing physical resources of a cloud-computing system, the method comprising:
    deploying a virtual machine on a server with resources, wherein at least some of the resources are unused resources not being used by either the server or other virtual machines on the server, wherein a first resource of the unused resources is allocated to a first virtual machine of the other virtual machines on the server, and wherein allocating a resource comprises giving a right to access the resource;
    granting the virtual machine access to all the unused resources, wherein the first resource of the unused resources remains allocated to the first virtual machine;
    changing an amount of the resources to which the virtual machine has access; and
    terminating the virtual machine when the amount of the resources to which the virtual machine has access is less than a minimum amount.

2. The method of claim 1, further comprising:
    reducing, after granting the virtual machine access to all the unused resources, the amount of the resources to which the virtual machine has access to less than the minimum amount; and
    terminating the virtual machine in response to reducing the amount of the resources to which the virtual machine has access to less than the minimum amount.

3. The method of claim 1, wherein the resources include a first type and a second type and the minimum amount specifies a first minimum amount of the first type of resource and a second minimum amount of the second type of resource.

4. The method of claim 3, wherein the amount of the resources to which the virtual machine has access is less than the minimum amount if either the virtual machine has access to an amount of the first type of resource less than the first minimum amount or the virtual machine has access to an amount of the second type of resource less than the second minimum amount.

5. The method of claim 3, wherein the amount of the resources to which the virtual machine has access is less than the minimum amount if the virtual machine has access to an amount of the first type of resource less than the first minimum amount and the virtual machine has access to an amount of the second type of resource less than the second minimum amount.

6. The method of claim 1, wherein the changing the amount of the resources to which the virtual machine has access is based at least in part on changes in use of the resources by the other virtual machines.

7. The method of claim 6, wherein the changes in the use of the resources by the other virtual machines include changes in the use of the resources by higher priority virtual machines.

8. The method of claim 6, wherein the changes in the use of the resources by the other virtual machines include changes in the use of the first resource of the unused resources.

9. The method of claim 1, wherein the changing the amount of the resources to which the virtual machine has access comprises:
    decreasing, at a first time, the amount of the resources to which the virtual machine has access; and
    increasing, at a second time different from the first time, the amount of the resources to which the virtual machine has access.

10. The method of claim 1, wherein allocating a resource further comprises guaranteeing access to the resource for a defined period of time.

11. A system for providing cloud-computing services, the system comprising:
    one or more processors;
    memory in electronic communication with the one or more processors; and
    instructions stored in the memory, the instructions being executable by the one or more processors to:
        deploy a virtual container on a server with resources, wherein the virtual container has a minimum size and wherein the minimum size is a minimum amount of the resources to which the virtual container must have access in order to continue operating;
        grant the virtual container, in connection with deploying the virtual container, access to an amount of the resources on the server that are not being used, wherein the amount of the resources is equal to or greater than the minimum size;
        decrease, at a first time, the amount of the resources to which the virtual container has access;
        increase, at a second time different from the first time, the amount of the resources to which the virtual container has access;
        decrease, at a third time after the first time and the second time, the amount of the resources on the server to which the virtual container has access to less than the minimum size; and
        terminate the virtual container when the amount of the resources on the server to which the virtual container has access is less than the minimum size.

12. The system of claim 11, wherein the virtual container is a certain type of virtual container and the instructions further comprise instructions to determine, before deployment of the virtual container, that the server does not include another virtual container of a same type as the virtual container.

13. The system of claim 11, wherein the instructions further comprise instructions being executable by the one or more processors to decrease the amount of the resources to which the virtual container has access when higher priority workloads use the resources, wherein the higher priority workloads include workloads performed for virtual containers having a higher priority than the virtual container.

14. A server that is part of a cloud-computing system, the server comprising:
    physical computing resources available for use by virtual machines to perform client workloads; and a virtual machine deployed on the physical computing resources, wherein
  the virtual machine, at an initial time, has access to a specified amount of the physical computing resources,
  the virtual machine is a certain type of virtual machine and the server does not include another virtual machine of a same type as the virtual machine,
  the virtual machine has a minimum size, wherein the minimum size indicates a minimum amount of the physical computing resources,
  the specified amount of the physical computing resources to which the virtual machine has access can change after the initial time,
  the virtual machine terminates if the specified amount of the physical computing resources to which the virtual machine has access at a particular time after the initial time is less than the minimum size, and
  the virtual machine loses access to a physical computing resource when another virtual machine with a higher priority than the virtual machine makes the physical computing resource unavailable.

15. The server of claim 14, wherein the physical computing resource becomes unavailable at least when the another virtual machine with a higher priority than the virtual machine uses the physical computing resources.

16. The server of claim 15, wherein the physical computing resources become unavailable at least when one or more other virtual machines with higher priority than the virtual machine use the physical computing resources.

17. The server of claim 14, wherein the physical computing resource becomes unavailable at least when the physical computing resource is allocated to the another virtual machine with a higher priority than the virtual machine.

18. The server of claim 14, wherein the physical computing resources include a first type of physical computing resource and a second type of physical computing resource and the minimum size of the virtual machine specifies a first minimum amount of the first type of physical computing resource and a second minimum amount of the second type of physical computing resource.

19. The server of claim 18, wherein the virtual machine terminates if either the virtual machine has access to an amount of the first type of physical computing resource less than the first minimum amount or the virtual machine has access to an amount of the second type of physical computing resource less than the second minimum amount.

20. The server of claim 18, wherein the virtual machine terminates if the virtual machine has access to an amount of the first type of physical computing resource less than the first minimum amount and the virtual machine has access to an amount of the second type of physical computing resource less than the second minimum amount.

* * * * *